United States Patent
Arandia et al.

(10) Patent No.: US 11,614,560 B2
(45) Date of Patent: Mar. 28, 2023

(54) INTEGRATION OF PHYSICAL SENSORS IN A DATA ASSIMILATION FRAMEWORK

(71) Applicant: International Business Machines Corporation, Armonk, NY (US)

(72) Inventors: Ernesto Arandia, Viareggio (IT); Fearghal O'Donncha, Mulhuddart (IR); Eli Michael Dow, Wappingers Falls, NY (US); Frank Liu, Austin, TX (US); Campbell D Watson, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 16/728,442

(22) Filed: Dec. 27, 2019

(65) Prior Publication Data
US 2021/0199842 A1 Jul. 1, 2021

(51) Int. Cl.
H04W 4/38 (2018.01)
G01V 99/00 (2009.01)
(Continued)

(52) U.S. Cl.
CPC ............ *G01V 99/005* (2013.01); *G06T 17/05* (2013.01); *H04B 17/11* (2015.01); *H04W 4/38* (2018.02);
(Continued)

(58) Field of Classification Search
CPC .. G01V 99/005; G01V 10/776; G01V 10/778; G01V 30/1916; G01V 30/19167;
(Continued)

(56) References Cited

U.S. PATENT DOCUMENTS

| 5,570,300 | A | * | 10/1996 | Henry | ................... | G01F 15/024 |
| | | | | | | 702/45 |
| 7,624,080 | B1 | | 11/2009 | Morales et al. | | |

(Continued)

FOREIGN PATENT DOCUMENTS

| CN | 102175269 A | | 9/2011 | | |
| CN | 109194761 A | * | 1/2019 | ......... | H04L 63/0428 |

OTHER PUBLICATIONS

Kim, Du Yong, and Moongu Jeon. "Robust distributed Kalman filter for wireless sensor networks with uncertain communication channels." (Hindawi, 2012) Mathematical Problems in Engineering. vol. 2012, Article ID 238597, 12 pages doi:10.1155/2012/238597 (Year: 2012).*

(Continued)

*Primary Examiner* — Rehana Perveen
*Assistant Examiner* — Daniel E Miller
(74) *Attorney, Agent, or Firm* — Patterson + Sheridan, LLP (57) ABSTRACT

A method and system for outputting a state of a physical system using a calibrated model of the physical system, where the calibrated model is used to generate a model prediction. The system includes a plurality of sensors connected to a routing node are used to monitor measured data of the physical system. A first sensor of the plurality of sensors includes a logic module configured to determine an uncertainty quantification, and to combine the uncertainty quantification with the model prediction to output the state of the physical system.

20 Claims, 7 Drawing Sheets

(51) Int. Cl.
  *G06T 17/05* (2011.01)
  *H04W 84/18* (2009.01)
  *H04B 17/11* (2015.01)
  *G06K 9/62* (2022.01)
  *H04L 67/12* (2022.01)

(52) U.S. Cl.
  CPC .......... *H04W 84/18* (2013.01); *G06K 9/6262* (2013.01); *H04L 67/12* (2013.01)

(58) Field of Classification Search
  CPC ....... G01V 30/302; G06T 17/05; G06F 30/20; G06K 9/6262; G06K 9/6266; H04B 17/11; H04L 67/12; H04W 4/38; H04W 84/18
  See application file for complete search history.

(56) References Cited

U.S. PATENT DOCUMENTS

| | | | |
|---|---|---|---|
| 10,209,063 B2* | 2/2019 | Anderson-Sprecher | G05D 1/0297 |
| 2016/0142160 A1* | 5/2016 | Walker | H04W 4/38 702/104 |
| 2016/0356125 A1 | 12/2016 | Bello et al. | |

OTHER PUBLICATIONS

De Paola, A. et al. "Context-awareness for multi-sensor data fusion in smart environments." (Springer, 2016) In Conference of the Italian Association for Artificial Intelligence, vol. 10037. pp. 377-391. DOI: 10.1007/978-3-319-49130-1_28 (Year: 2016).*

Papageorgiou, Apostolos, Bin Cheng, and Ernö Kovacs. "Real-time data reduction at the network edge of Internet-of-Things systems." (IEEE, 2015) In 2015 11th international conference on network and service management (CNSM), pp. 284-291. (Year: 2015).*

Lavassani, Mehrzad, Stefan Forsström, Ulf Jennehag, and Tingting Zhang. "Combining fog computing with sensor mote machine learning for industrial IoT." (MDPI, 2018) Sensors 18, No. 5: 1532. https://doi.org/10.3390/s18051532 (Year: 2018).*

Ismael, Waleed M., Mingsheng Gao, Asma A. Al-Shargabi, and Ammar Zahary. "An in-networking double-layered data reduction for internet of things (IoT)." (MDPI, 2019) Sensors 19, No. 4: 795. https://doi.org/10.3390/s19040795 (Year: 2019).*

Bijarbooneh, Farshid Hassani, Wei Du, Edith C-H. Ngai, Xiaoming Fu, and Jiangchuan Liu. "Cloud-assisted data fusion and sensor selection for internet of things." (IEEE, 2015) IEEE Internet of Things Journal 3, No. 3: 257-268. (Year: 2015).*

Yan et al., "Bidirectional Feedback Dynamic Particle Filter with Big Data for the Particle Degeneracy Problem", Tsinghua Science and Technology, vol. 23, is: 4, P463-478, Aug. 16, 2018.

* cited by examiner

INTEGRATION OF PHYSICAL SENSORS IN A DATA ASSIMILATION FRAMEWORK

BACKGROUND

The present invention relates to computer modeling, and more specifically, to modeling the state of a complex physical system.

Data assimilation is a technique that combines observational data with output from a numerical model to estimate a state of a system. Data assimilation networks can include sensors that observe aspects of a physical system, such as ocean currents. The sensors can be incorporated into a model state of a numerical model of the physical system. The sensors can perform measurement, basic data processing, and communication. The model state is a representation of the variables that attempts to fully describe the actual physical state of the system. The model is used because the number of observations available can be orders of magnitude smaller than the number of values required to specify the state of the physical system.

SUMMARY

According to one embodiment of the present invention, a method of assessing a state of a physical system, the method comprising generating a model prediction using a calibrated model of a physical system and monitoring measured data of the physical system using a plurality of sensors connected to a routing node, where a first sensor of the plurality of sensors includes a logic module configured to determine an uncertainty quantification regarding the measured data and to combine the uncertainty quantification with the model prediction to output a state of the physical system.

According to another embodiment, a system includes a calibrated model of a physical system configured to generate a model prediction, and a plurality of sensors monitoring measured data of the physical system and connected to a routing node, where a first sensor of the plurality of sensors includes a logic module configured to determine an uncertainty quantification and to combine the uncertainty quantification with the model prediction to output a state of the physical system.

According to another embodiment, a computer program product for assessing a state of a physical system, the computer program product comprising a computer-readable storage medium having computer-readable program code embodied therewith, the computer-readable program code executable by one or more computer processors to generate a model prediction using a calibrated model of a physical system, and monitor measured data of the physical system using a plurality of sensors connected to a routing node, where a first sensor of the plurality of sensors includes a logic module configured to determine an uncertainty quantification and to combine the uncertainty quantification with the model prediction to output a state of the physical system.

DETAILED DESCRIPTION

An embodiment of a system may use data assimilation to optimally combine available observations with a numerical model in order to perform predictive analysis of the system. The system may integrate sensors within a predictive data assimilation framework by enabling advanced capabilities to the sensor. An embodiment of the system may automatically integrate noisy and redundant sensor observations with predictive systems used to monitor and manage complex physical systems, such as a fluid system in a lake.

Associated methods may output a state of the physical system using a calibrated model of the physical system. A calibrated model may be used to generate a model prediction. The system includes a plurality of sensors connected to a routing node are used to monitor measured data of the physical system. A first sensor of the plurality of sensors includes a logic module configured to determine an uncertainty quantification, and to combine the uncertainty quantification with the model prediction to output the state of the physical system.

Unlike in conventional data assimilation, the system may include combining local and edge (on-sensor) analytics to generate a better data assimilation method. The edge analytics may be used to estimate sensor uncertainty and the weight attached to measurements relative to model estimate.

A particular embodiment of a system may bridge a gap between pure data collection by sensors and online predictive modeling. The predictive modeling may be oriented to decision support in management of complex physical systems. The system may include integrated sensors and predictive models within a data assimilation framework.

An embodiment of the system may estimate with high accuracy the uncertainties of measured data in real time using knowledge of the raw sensor data and a data filtering process. The system may identify sensors and parameters that may be modified in a raw data filtering process based on accuracy of corrected model predictions. An automatic calibration mechanism of the system may use feedback from the data assimilation framework at the core analytics level in order to optimize the type and parameters of the data filtering process at the sensor level.

An embodiment of the system may model a state of a complex physical system (e.g., a hurricane, lake system, or forested area). The system may use a calibrated coupled model (e.g., weather, hydrodynamics, and/or runoff models) of the physical system. The system may include a sensor network, local data assimilation analytics, and core data assimilation analytics.

The sensor network of an embodiment may include a plurality of sensors connected to the system through one or more routing nodes. The sensors may be configured to perform data acquisition, stream data filtering, and the transmission of data to a cloud or a central data warehouse. Notably, the sensors may additionally be configured to perform uncertainty quantification and may report in real time. The sensors may perform an acquisition of feedback from local and core data assimilation analytics. The sensors may also perform automatic type selection and parameter setting of a filtering mechanism using system feedback. The sensors may use a wide range of stream data filter types.

The local data assimilation analytics may include components of edge architecture, such as gateways, a messaging interface, and sensor data storage. Notably, the data assimilation analytics may be in charge of optimizing and otherwise tuning the filtering process at sensor level.

The core data assimilation analytics may include sensor observations that may be assimilated. For instance, the sensor observations may be combined with model predictions using information on uncertainty at a sensor level. The uncertainty estimation may be used dynamically according to results of model performance or after data assimilation analytics.

Parameters at the sensor level may be related to a stream data filtering process. Parameters at the core data analytics level may be related to covariance calculations used in assimilating available measurements. A heuristics process may be used to tune the parameters at both levels.

The system may include a calibrated coupled model (e.g., hydrodynamics, runoff, weather) relating to a physical system, as well as a plurality of sensors connected to a physical system through a routing node. The first sensor of the plurality of sensors may be configured to determine uncertainty quantification. The uncertainty quantification may be reported in real time. The system may combine sensor observations with model predictions using information on uncertainty at a sensor level.

An embodiment of the system may enable advanced analytic capabilities at the sensor level for the purpose of intelligently integrating physical sensing, modeling, and data assimilation. They system may perform observation processing on the sensor side synchronized with data processing at the data assimilation framework. The data processing may include processes that extend beyond simple filtering on the sensor measurements. For example, the data processing at the sensors may include synchronized filtering and data assimilation. The system may enable quality control at the sensor side guided by the data assimilation framework. One or more sensors may be configured to perform a diagnosis of the quality of the signal. An embodiment of a sensor may perform measurement noise characterization, as well as adaptive sensor polling according to feedback from the data assimilation framework. The sensor may further provide a diagnosis oriented to improving the sensor mesh network.

Data filtering may include processing data at the sensor level with the objective of reducing noise. An illustrative embodiment of data filtering may include using a low pass filter.

Data assimilation may include a process where observations from sensors of the physical system are used to correct predictions of a numerical model of the physical system of interest. Local sensor data assimilation analytics may include analytics positioned at the sensor (e.g., edge, or gateway) level to optimize a raw data stream filtering process through the tuning of parameters using feedback from a predictive accuracy at the core data assimilation analytics level.

An edge gateway may include a component capable of not only of steering sensor data traffic, but also of storing, and acting on the data. Action of an embodiment may be performed through the local data assimilation analytics. Core data assimilation analytics may combine sensor data and metadata with model predictions to improve model results. The core data assimilation analytics may also improve the data assimilation process using real-time filtered sensor data, plus information regarding an uncertainty real-time filtered sensor data.

In one particular implementation, the data assimilation system may include a network of sensor sondes deployed throughout a lake. The sensor sondes may be integrated with the local and core analytics. Each sonde of the embodiment acquires data on several environmental parameters frequently and at a constant rate. The streams of data generated may be filtered at the sonde level to reduce noise. Accurate measurements and information about the uncertainty of the sonde sensor data may be provided by the sonde sensors in real time. The data assimilation system may tune the filtering process to obtain the best possible information at the sensor level in order to assimilate the data and data uncertainty towards improving model predictions.

Continuing with the above example, for a given variable (e.g., temperature), a sensor may collect a stream of raw data at a high sampling frequency (e.g., 4 Hz). The raw data measurements may be relatively noisy due to local environmental conditions. The sensor may be equipped with a library of filters to preprocess the raw data.

Filtered data point (e.g., the output of a moving average filter) may include an associated time and time interval. The filter may have a parameter comprising a length of a rolling window. The uncertainty of the reported measurements may be estimated during the filtering process. Any other type of filter (e.g., an adaptive filter) and filter parameters may produce a different preprocessed pair.

This feature contrasts conventional sensors that neither report this uncertainty nor receive feedback to select a different filter (and its parameters). The uncertainty may be affected considerably by the filter parameters and changes with time. The parameters may be continuously tuned using feedback from the core data assimilation analytics.

Field measurements may be mapped to the physical model of the lake with a predefined spatial-temporal resolution. Data assimilation in this example may include use of an optimal interpolation scheme:

A computation and update may comprise a measurement covariance matrixes for measurements and model. The computational process may use real-time uncertainty estimates. Assimilation processes may include optimally combining data and data uncertainties, model predictions, modelling uncertainties, and covariance estimates. Output of the data assimilation analytics may be assessed in terms of improving model accuracy.

An optimization process of an embodiment of the system may tune parameters at the core data assimilation level by adjusting parameters of the state error covariance calculations (e.g., measurement uncertainties). Another or the same embodiment may turn parameters at the local data assimilation level by providing feedback to tune the data filtering parameters.

The modeling system may use data assimilation to optimally combine available observations with a numerical model in order to perform predictive analysis of the physical system. Associated methods may output a state of a physical system using a calibrated model of the physical system, where the calibrated model is used to generate a model prediction. The system includes a plurality of sensors connected to a routing node are used to monitor measured data of the physical system. The system may integrate sensors within a predictive data assimilation framework by enabling advanced capabilities to the sensor. At least one of the sensors includes a logic module configured to determine an uncertainty quantification regarding the measured data and to combine the uncertainty quantification with the model prediction to output the state of the physical system. An embodiment of the system may automatically integrate noisy and redundant sensor observations with predictive systems used to monitor and manage complex physical systems.

Figure 1:
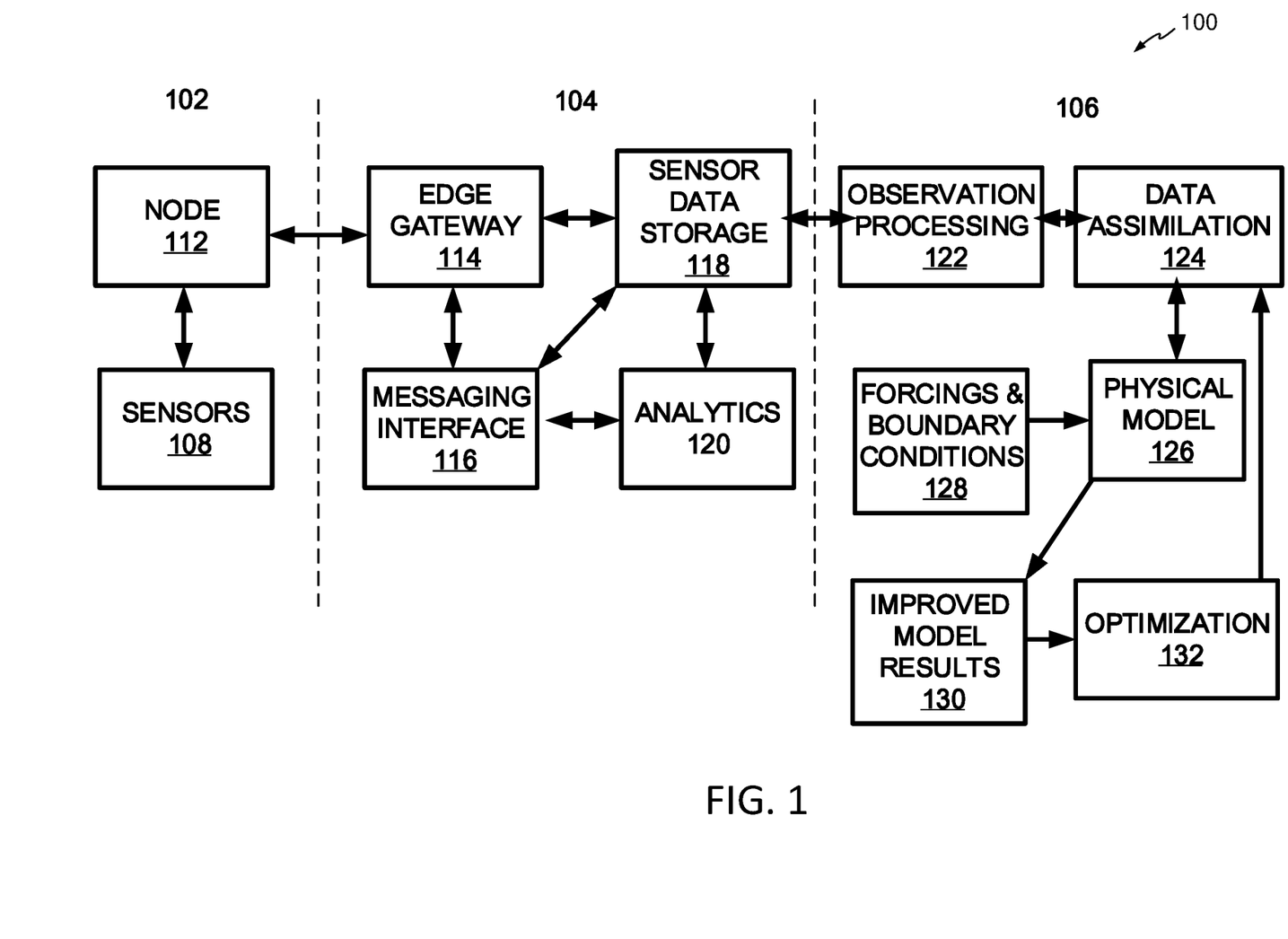
FIG. 1 is block diagram of another embodiment of a computing system configured to monitor, model, and facilitate determining a state of a physical system.

FIG. 1 is a block diagram of an embodiment of a system 100 configured to model a state of a complex physical system. The system may include a sensor network 102 comprising of a plurality of sensors 108, local data assimilation analytics 104, and core data assimilation analytics 106 (denoted by dashed boundary lines). The physical system may comprise natural forces such are present in physical systems such as: a geographical region, a water system, a gravitational system, a thermal system, and a wind system, among others.

The sensor network 102 of an embodiment may include a plurality of sensors 108 connected to the system 100 through one or more routing nodes 112. The sensors 108 may be configured to perform data acquisition, stream data filtering, and the transmission of data to a cloud or a central data warehouse. The sensors 102 may additionally be configured to perform uncertainty quantification and may report results in real time. The sensors 108 may perform an acquisition of feedback from local and core data assimilation analytics. The sensors 108 may also perform automatic type selection and parameter setting of a filtering mechanism using system feedback. The sensors 108 may use a wide range of stream data filter types.

In operation, the sensor network 102 may perform processes that include the physical sensors 108 acquiring environmental data at a constant rate. A filtering algorithm performed at the sensors 108 (or at a processor in communication with the sensors 108) may process the data stream to produce data that is stored in a historical database 118. The type of filtering algorithm and parameters of the filtering may be automatically optimized at the core and local data assimilation analytics levels 104, 106 and may be set accordingly at the sensor level 102. The sensors 108 may monitor and provide feedback on the measurement uncertainty (e.g., an accuracy of the measurements) based on automatic analysis during the filtering process.

The local data assimilation analytics 104 may include components of edge architecture, such as gateways, a messaging interface, and sensor data storage. The data assimilation analytics 104 may be in charge of optimizing and otherwise tuning the filtering process at sensor level. As shown in FIG. 1, the local data assimilation analytics 104 may include an edge gateway module 114, a sensor messaging interface 116, sensor data storage 118, and a data assimilation analytics module 120.

Filtered sensor data may be received at the edge gateway module 114 and combined with relevant metadata to provide the filtered measurements, uncertainty characteristics, and information about the filtering process. Data may be routed to the data assimilation analytics module 120 via the sensor messaging interface 116. Local or edge analytics at the data assimilation analytics module 120 may optimize the filtering process through the tuning of parameters using feedback from predictive accuracy at the core data assimilation analytics level.

The core data assimilation analytics 106 may include sensor observations that may be assimilated. For instance, the sensor observations may be combined with model predictions using information on uncertainty at a sensor level. The uncertainty estimation may be used dynamically according to results of model performance or after data assimilation analytics.

Parameters at the sensor level may be related to a stream data filtering process. Parameters at the core data analytics level may be related to covariance calculations used in assimilating available measurements. A heuristics process may be used to tune the parameters at both levels.

As shown in the embodiment of FIG. 1, the core data assimilation analytics 106 may include an observation processing module 122, a data assimilation module 124, a physical model module 126, a forcings and boundary conditions module 128, an improved model results module 130, and a data assimilation optimization module 132.

The physical model module 126 may model a state of a complex physical system (e.g., a lake system). The system may use a calibrated coupled model (e.g., hydrodynamics, runoff, and/or weather models) of the physical system.

The data assimilation module 124 may receive historical and real time sensor data from the sensor data module 118 of the local data assimilation analytics 104. The sensor data may be filtered and include an indication of its uncertainty. The data assimilation module 124 may additionally include model predictions. The model predictions may be provided by the physical model module 126 and the forcings and boundary conditions module 128.

The observation processing module 122 may provide filtered observations and information concerning observation errors to the data assimilation module 124. The data assimilation module 124 may provide data assimilation feedback to the observation processing module 122.

The data assimilation module 124 may provide optimally combined observations and model results to the physical model module 126. The physical model module 126 may provide model results and information modelling errors back to the data assimilation module 124.

The data assimilation module 124 may combine the sensor data and metadata with the model predictions to improve model results. The data assimilation module 124 may optimize results by tuning the data assimilation parameters and by providing feedback for tuning the filtering/uncertainty estimation processes (e.g., provided at the sensor level).

Figure 2:
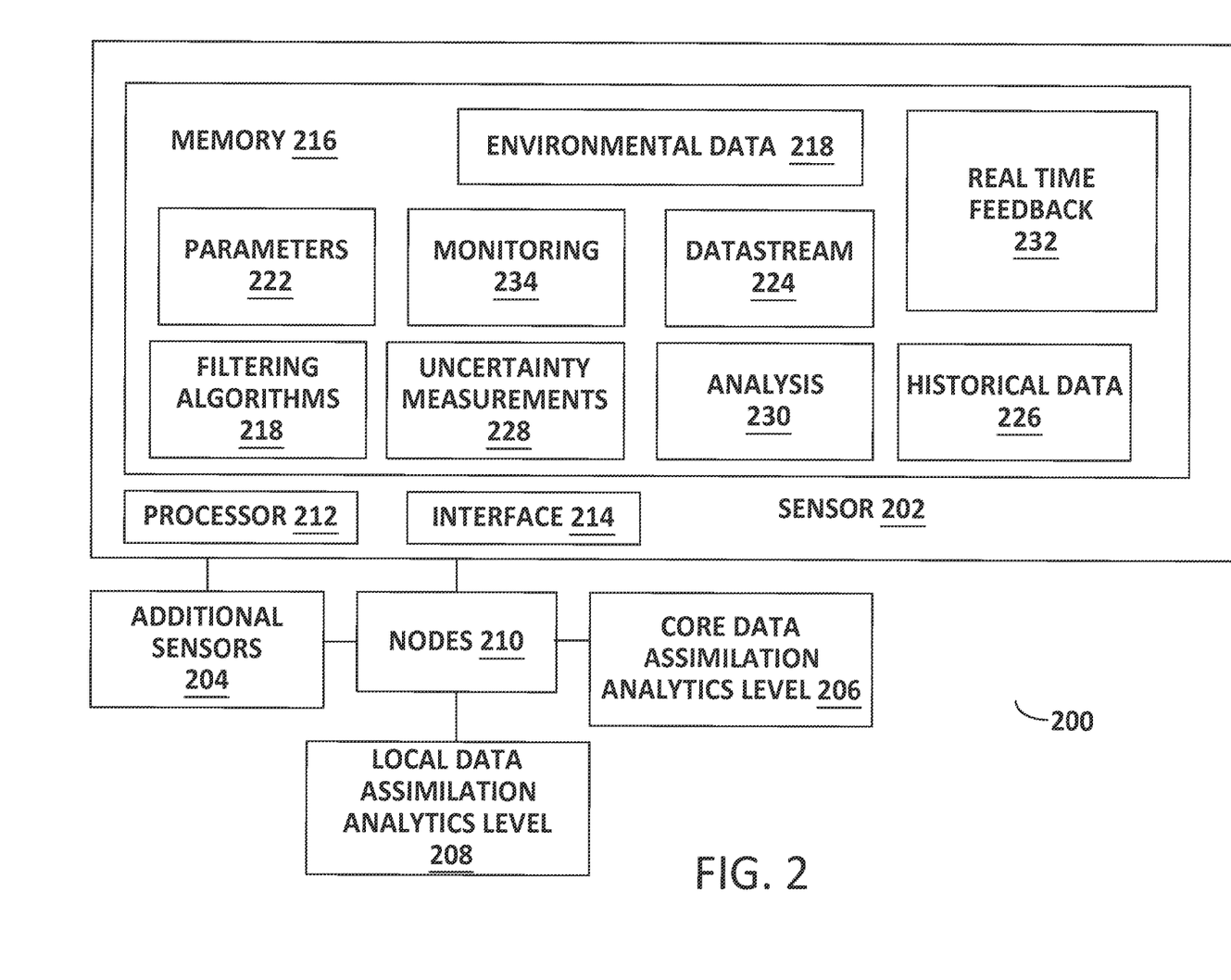
FIG. 2 is block diagram of another embodiment of a computing system configured to monitor and facilitate determining a state of a physical system at the sensor level.

FIG. 2 is block diagram of another embodiment of a computing system 200 configured to monitor and facilitate determining a state of a physical system. All or some of the modules shown in FIG. 2 may be present and executed at the sensor level, including sensor 202. As such, the sensor 202 of the system 200 may be coupled to or otherwise in communication with additional sensors 204, a core data assimilation analytics level 206, and a local data assimilation analytics level 208. For instance, the sensor module 202 may be connected directly or via a plurality of nodes 210.

The sensor module 202, or sensor, may include a processor 212, an interface 214, and a memory 216. As shown in the embodiment of the system 200 of FIG. 2, the memory 216 may include stored and real time environmental data 218, a filtering algorithms module 220, and parameters 222 for using in analysis. The memory 216 may additionally include data stream data 224, historical data 226, an uncertainty measurements module 228, an analysis module 230, a real time feedback module 232, and monitoring module 234.

The system 200 may perform processes that include the physical sensors 202, 204 acquiring the environmental data 218 at a constant rate. The filtering algorithm 218 performed at the sensors 202, 204 may process the data stream to produce data that is stored in a historical database 226. The type of filtering algorithm 218 and parameters 222 of the filtering may be automatically optimized at the core and local data assimilation analytics levels 206, 208 and may be set accordingly at the sensor level. The sensors 202, 204 may monitor and provide feedback on the measurement uncertainty based on automatic analysis during the filtering process.

Figure 3:
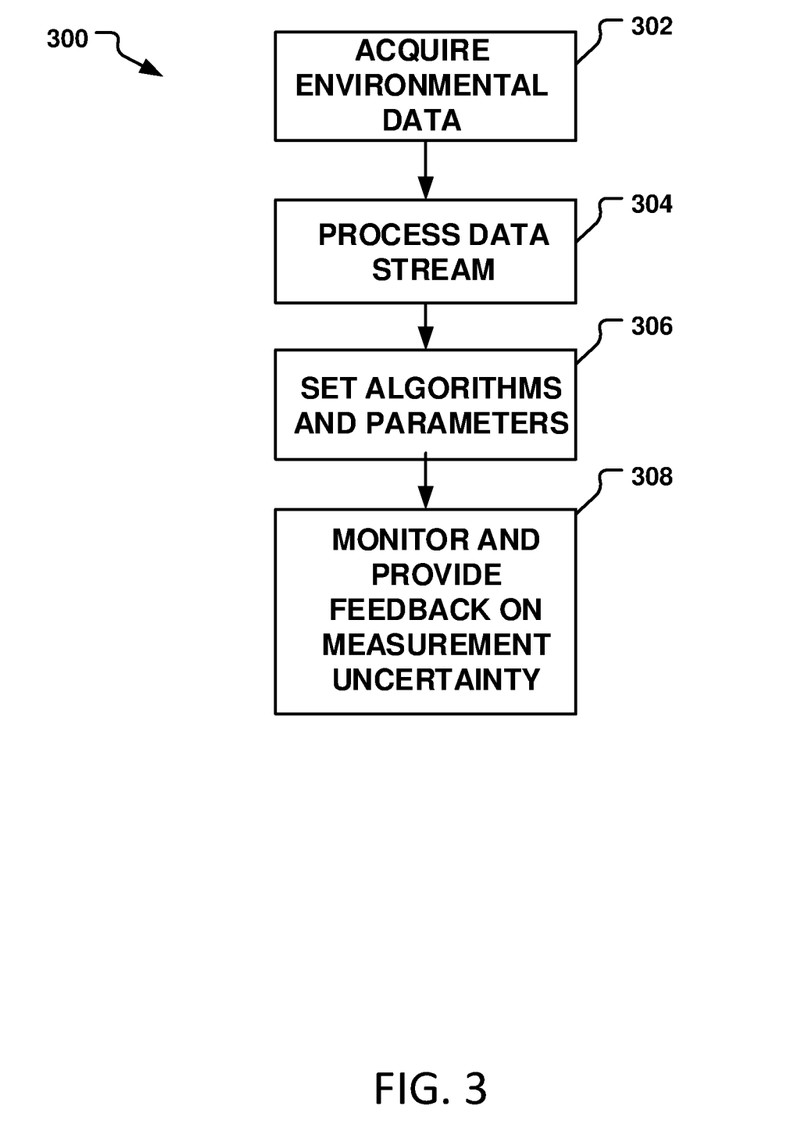
FIG. 3 is a flowchart of an embodiment of a method of performing aspects of data assimilation to model a state of a complex physical system using sensor network processes.
Figure 4:
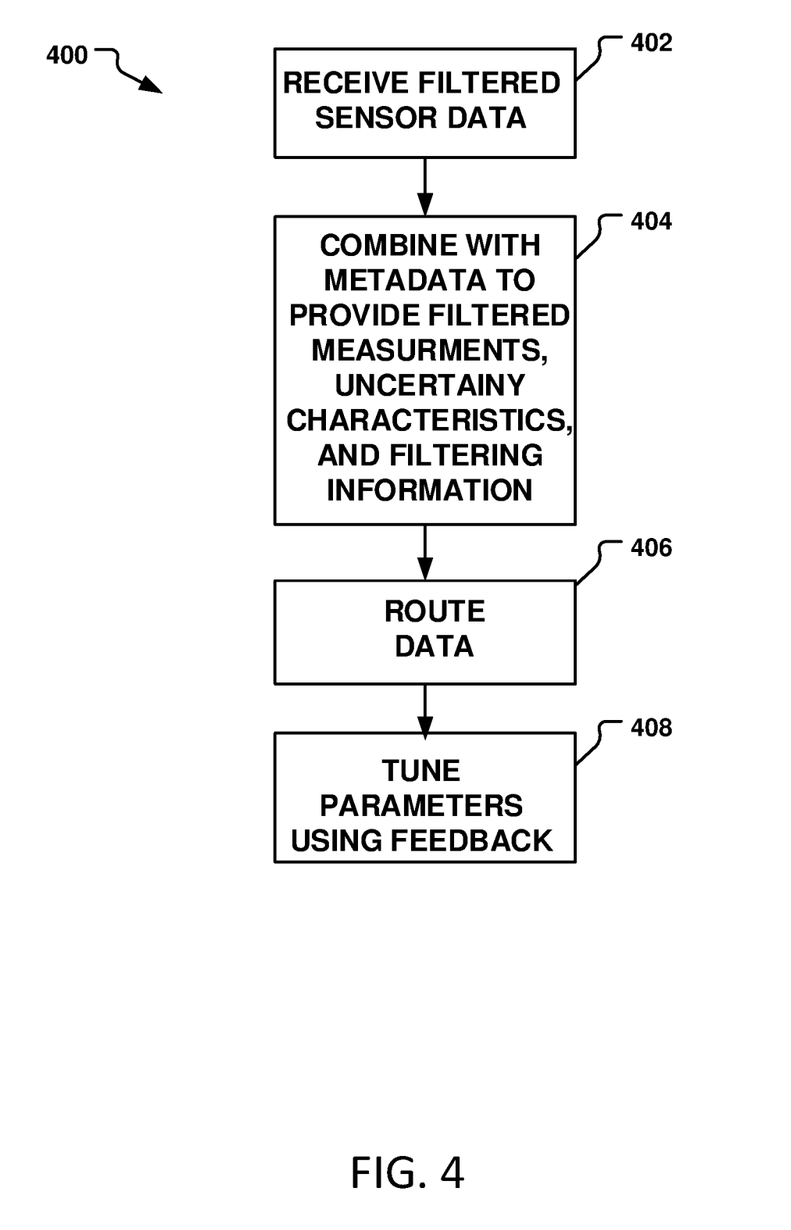
FIG. 4 is a flowchart of an embodiment of a method of performing aspects of data assimilation to model a state of a complex physical system using local data assimilation analytics.
Figure 5:
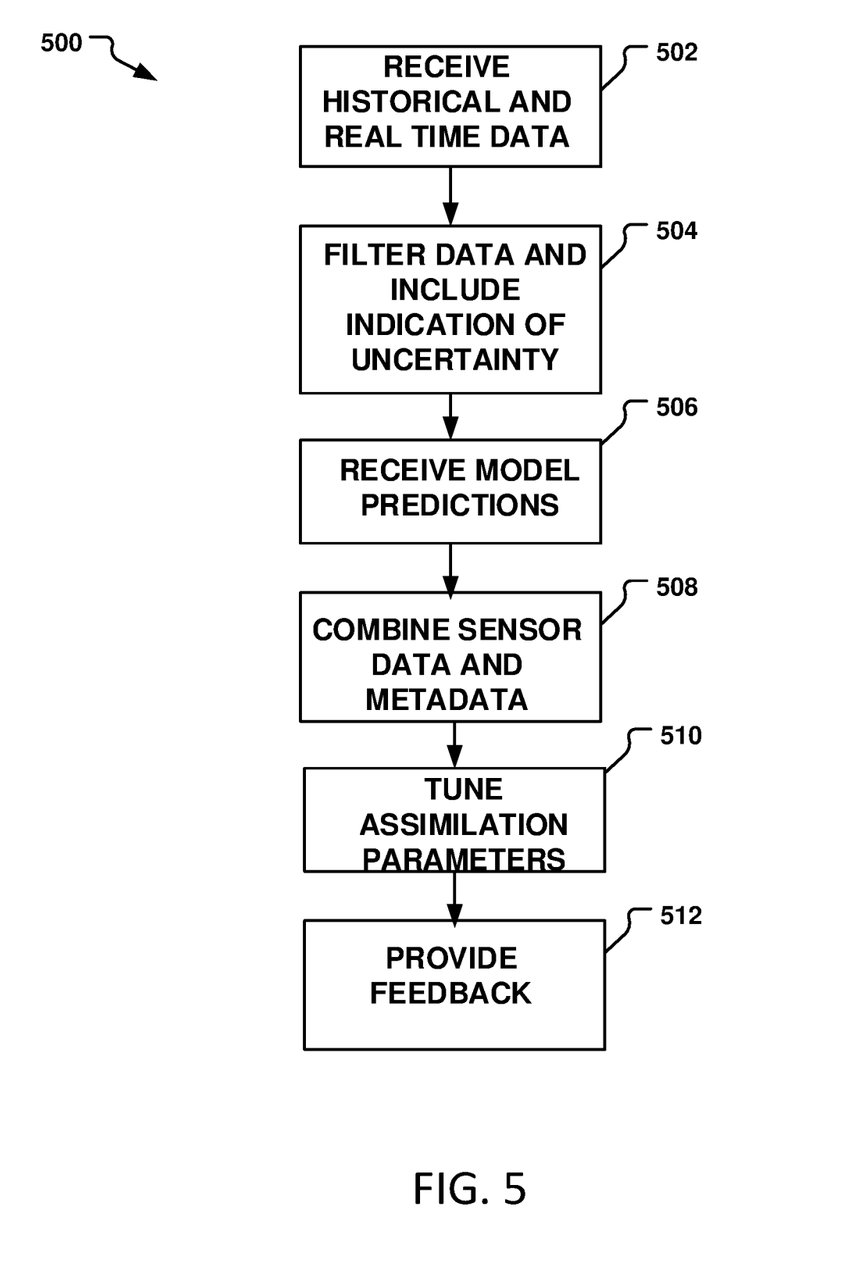
FIG. 5 is a flowchart of an embodiment of a method of performing aspects of data assimilation to model a state of a complex physical system using core data assimilation analytics.

FIGS. 3-5 are flowcharts that illustrate embodiments of methods 300, 400, 500 of performing aspects of data assimilation in a manner consistent with embodiments of the system. The methods may be performed by a system, such as the illustrative system 100 of FIG. 1 to model a state of a complex physical system using sensor network processes, local data assimilation analytics, and core data assimilation analytics.

Turning more particularly to the sensor network processes of the flowchart of FIG. 3, the sensor network 102 at 302 may perform processes that include the physical sensors 108 acquiring environmental data at a constant rate. A filtering algorithm executed at the sensors 108 (or at a processor in communication with the sensors 108) may process the data stream at 304 to produce data that is stored in a historical database 118.

At 306, the type of filtering algorithm and parameters of the filtering may be automatically optimized at the core and local data assimilation analytics levels 104, 106 and may be set accordingly at the sensor level 102. The sensors 108 at 308 may monitor and provides feedback on the measurement uncertainty (e.g., an accuracy of the measurements) based on automatic analysis during the filtering process.

Turning more particularly to the sensor network processes of the embodiment of the method 400 shown in FIG. 4, filtered sensor data may be received at the edge gateway module at 402 and combined at with relevant metadata at 404 to provide the filtered measurements, uncertainty characteristics, and information about the filtering process.

Data may be routed at 406 to the data assimilation analytics module 120 via the sensor messaging interface 116. Local or edge analytics at the data assimilation analytics module 120 may optimize the filtering process through the tuning of parameters at 408 using feedback from predictive accuracy at the core data assimilation analytics level.

Turning more particularly to the core data assimilation analytics processes of FIG. 5, the data assimilation module 124 may at 502 receive historical and real time sensor data from the sensor data module 118 of the local data assimilation analytics 104. The sensor data may be filtered and include an indication of its uncertainty at 504. The data assimilation module 124 may additionally receive model predictions at 506. The model predictions may be provided by the physical model module 126 and the forcings and boundary conditions module 128.

The data assimilation module 124 may combine the sensor data and metadata with to improve model results at 508. The data assimilation module 124 may optimize results by tuning the data assimilation parameters at 510 and by providing feedback at 512 for tuning the filtering/uncertainty estimation processes (e.g., provided at the sensor level).

Figure 6:
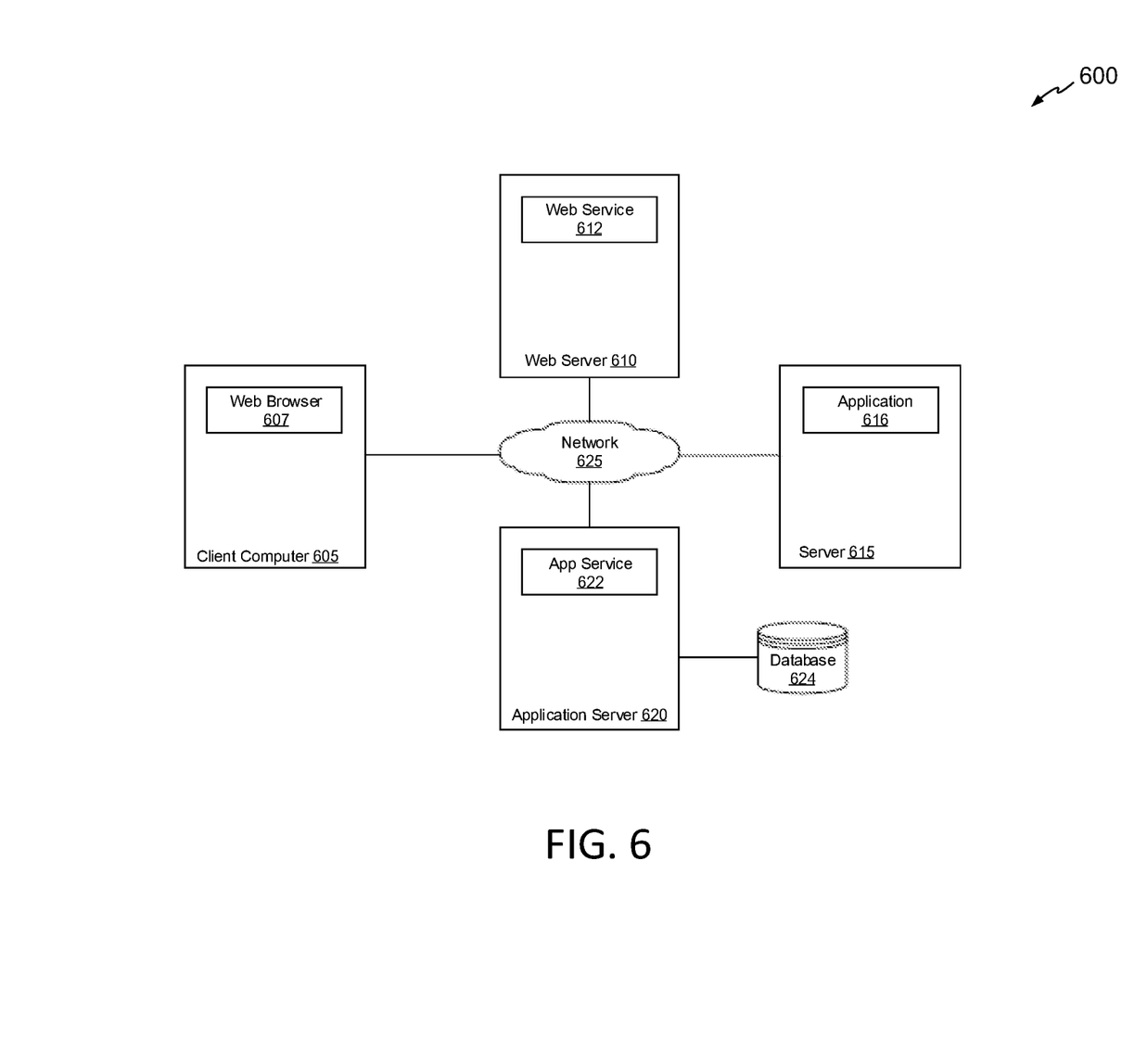
FIG. 6 shows a block diagram of a computing system in accordance with an embodiment.

FIG. 6 illustrates another example computing system according to one embodiment, such as may be realized using a networked environment. As shown, the computing environment 600 includes a client computer 605, a web server 610, a server 615, an application 616, and an application server 620. The client computer 605 may be a physical system (e.g., a desktop, laptop computer, mobile device, etc.) or a virtual computing instance executing in the cloud. The client computer 605 includes a web browser 607. A user may access data services through the web browser 607 over a network 625 (e.g., the Internet).

For instance, a user may access a web service 612 executing on a web server 610. In one embodiment, the web service 612 provides a web interface for an application server 620 (e.g., executing an application service 622). More specifically, the application service 622 provides a database 624. The database 624 may include data presented to users on the web browser 607.

Figure 7:
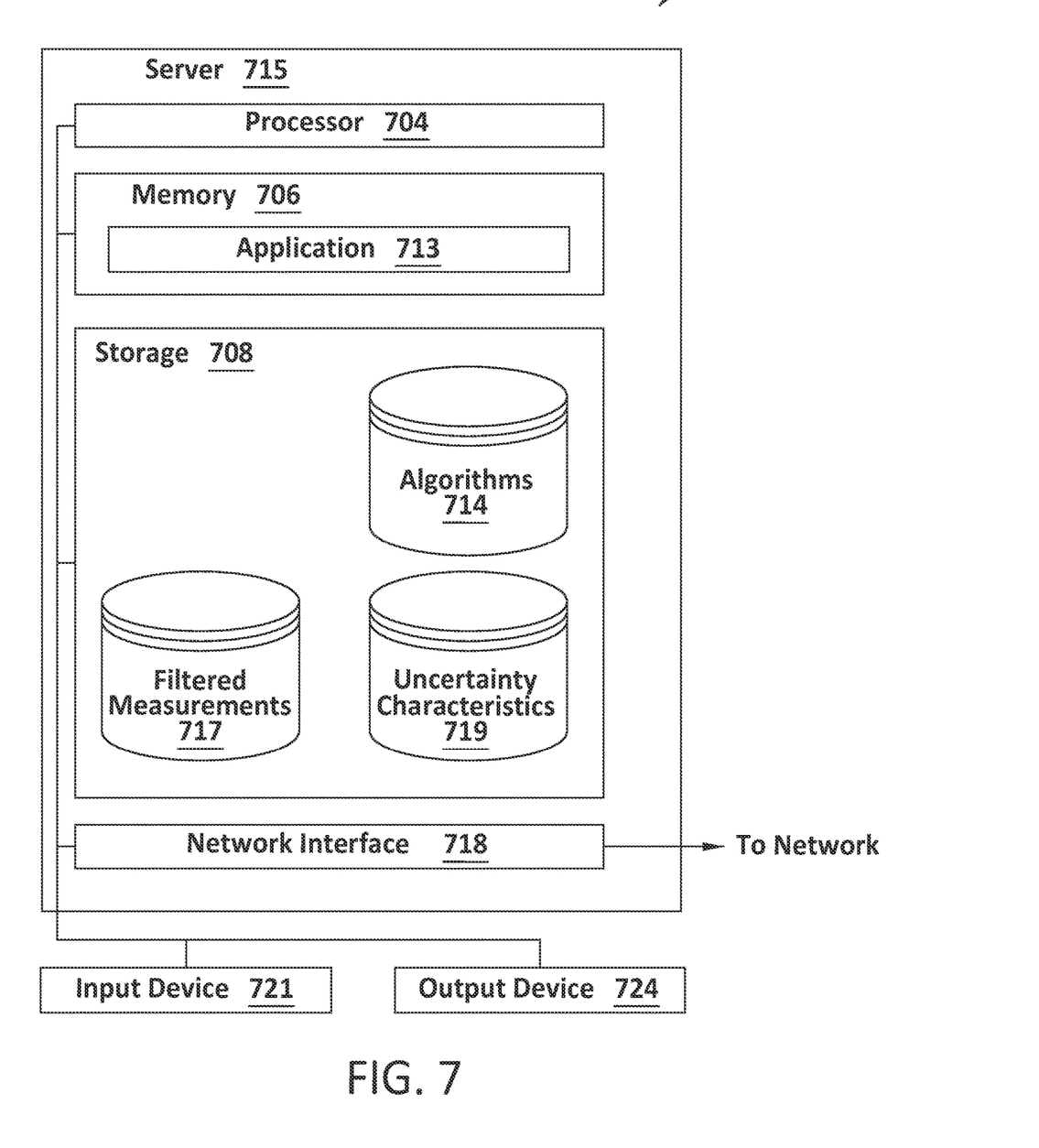
FIG. 7 further illustrates a server, such as the server of FIG. 6, according to one embodiment.

FIG. 7 further illustrates a server 715, such as the server 615 of FIG. 6, according to one embodiment. The server 715 generally includes a processor 704 connected via a bus to a memory 706, a network interface device 718, a storage 708, an input device 721, and an output device 724. The server 715 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 704 is included to be representative of a single CPU, multiple CPUs, a single CPU having multiple processing cores, and the like. Similarly, the memory 706 may be a random access memory. While the memory 706 is shown as a single identity, it should be understood that the memory 706 may comprise a plurality of modules, and that the memory 706 may exist at multiple levels, from high speed registers and caches to lower speed but larger DRAM chips. The network interface device 718 may be any type of network communications device allowing the navigation server 715 to communicate with other computers via the network 625.

The storage 708 may be a persistent storage device. Although the storage 708 is shown as a single unit, the storage 708 may be a combination of fixed and/or removable storage devices, such as fixed disc drives, solid state drives, removable memory cards, optical storage and network storage systems.

As shown, the memory 706 contains the application 713, which may be an application generally executed to take actions described herein. Storage 708 contains the algorithms 714, filtered measurements 717, and uncertainty characteristics 719.

The input device 721 may provide a keyboard and/or a mouse, etc. The output device 724 may be any conventional display screen. Although shown separately from the input device 721, the output device 724 and input device 721 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., threshold adjustment algorithms) or related data available in the cloud. For example, the modules of FIG. 1 could execute on a computing system in the cloud and. In such a case, the threshold adjustment algorithms could adjust response thresholds and store the new values at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof. While certain embodiments are applicable to spoken language systems, the claims are not limited or even particularly applicable to spoken language interfaces. In one example, an embodiment of a method may not relate to speech modality. The scope thereof is thus determined by the claims that follow.

The invention claimed is:

1. A method for a modeling system, having a sensor network component, a core analytics component, and an edge analytics component and tuned using bidirectional feedback, to assess a state of a physical system, the method comprising:
generating, by the core analytics component, a model prediction using a calibrated model of the physical system, the core analytics component including one or more computer processors;
determining, at a first sensor of a plurality of sensors connected to a routing node, an uncertainty quantification of the first sensor by estimating an uncertainty of a data point in a set of raw data collected at the first sensor by monitoring the physical system, wherein the uncertainty is estimated during a filtering process at the first sensor to reduce noise in the set of raw data, wherein the plurality of sensors and the routing node are of the sensor network component;
combining, by the core analytics component, the model prediction and the uncertainty quantification to produce a corrected model prediction representative of the state of the physical system;
adjusting, at the core analytics component, a parameter of an assimilation process for raw data, based on feedback from the sensor network component; and
adjusting, by an edge gateway of the edge analytics component, at least one of a type and a parameter of a filtering algorithm of the filtering process at the first sensor of the sensor network component, based on feedback from the core analytics component.

2. The method of claim 1, further comprising reporting the uncertainty quantification in real time by the plurality of sensors.

3. The method of claim 1, wherein the uncertainty quantification is determined in real time using the set of raw data and the filtering process.

4. The method of claim 1, wherein the corrected model prediction is output.

5. The method of claim 4, further comprising modifying execution at the first sensor based on an accuracy of the corrected model prediction.

6. The method of claim 4, wherein the parameter of the assimilation process pertains to a covariance calculation used in assimilating the raw data.

7. The method of claim 1, wherein the physical system comprises natural forces of at least one of: a geographical region, a water system, a gravitational system, a thermal system, and a wind system.

8. The method of claim 1, wherein the core analytics component comprises a core data assimilation analytics component, wherein the edge analytics component comprises an edge data assimilation analytics component, wherein the set of raw data comprises a stream of raw data;
wherein both steps of adjusting are based on the corrected model prediction, wherein the type of the filtering algorithm and the parameter of the filtering algorithm are both adjusted, wherein the parameter of the filtering algorithm is specific to the type of the filtering algorithm;
wherein the core data assimilation analytics component comprises a plurality of subcomponents including an observation processing subcomponent, a forcing and boundary condition subcomponent, a data assimilation subcomponent, an optimization subcomponent, and a physical model subcomponent comprising the calibrated model, wherein operations of the core data assimilation analytics component are performed by one or more computing devices comprising one or more non-edge devices.

9. The method of claim 8, wherein the edge data assimilation analytics component comprises a plurality of subcomponents including an edge gateway subcomponent, a messaging interface subcomponent, an analytics subcomponent, and a sensor data storage subcomponent;

wherein the method further comprises:

reporting the uncertainty quantification in real time by the plurality of sensors;

determining at the first sensor the uncertainty quantification in real time using the set of raw data and the filtering process;

wherein the feedback from the sensor network component comprises indirect feedback insofar as the uncertainty quantification is reflected in the corrected model prediction;

wherein the feedback from the core analytics component comprises indirect feedback insofar as the model prediction prior to correction is still reflected in the corrected model prediction.

10. The method of claim 9, further comprising:

modifying, by the edge analytics component, raw data collected by the first sensor of the sensor network component, based on the feedback from the core analytics component; and modifying, by the edge analytics component, execution at the first sensor based on the feedback from the core analytics component;

wherein the parameter of the assimilation process pertains to a covariance calculation used in assimilating raw data;

wherein the filtering and assimilation processes are synchronized with each other;

wherein the physical system comprises, in each of a plurality of instances of executing the method, a respective one of natural forces of at least one of: a geographical region, a water system, a gravitational system, a thermal system, and a wind system.

11. A system, tuned using bidirectional feedback, to assess a state of a physical system, the system comprising:

a sensor network component comprising a routing node and a plurality of sensors connected to the routing node, the plurality of sensors including a first sensor configured to determine an uncertainty quantification of the first sensor by estimating an uncertainty of a data point in a set of raw data collected at the first sensor by monitoring the physical system, wherein the uncertainty is estimated during a filtering process at the first sensor to reduce noise in the set of raw data;

a core analytics component comprising one or more computer processors and a calibrated model of the physical system, wherein the calibrated model is usable to generate a model prediction, wherein the core analytics component is configured to:

combine the model prediction and the uncertainty quantification to produce a corrected model prediction representative of the state of the physical system; and adjust a parameter of an assimilation process for raw data, based on feedback from the sensor network component; and an edge analytics component comprising an edge gateway configured to adjust at least one of a type and a parameter of a filtering algorithm of the filtering process at the first sensor of the sensor network component, based on feedback from the core analytics component.

12. The system of claim 11, wherein the plurality of sensors is configured to report in real time.

13. The system of claim 11, wherein the uncertainty quantification is determined in real time using the set of raw data and the filtering process.

14. The system of claim 11, wherein the corrected model prediction is output.

15. The system of claim 14, wherein execution at the first sensor is modified based on an accuracy of the corrected model prediction.

16. The system of claim 14, wherein the parameter of the assimilation process is modified based on an accuracy of corrected model prediction, wherein the parameter of the assimilation process relates to a covariance calculation used in assimilating the raw data.

17. The system of claim 11, wherein the physical system comprises natural forces of at least one of: a geographical region, a water system, a gravitational system, a thermal system, and a wind system.

18. The system of claim 11, wherein the state is output and modified by tuning the parameter of the assimilation process.

19. A computer program product for a modeling system, having a sensor network component, a core analytics component, and an edge analytics component and tuned using bidirectional feedback, to assess a state of a physical system, the computer program product comprising:

a computer-readable storage medium having computer-readable program code embodied therewith, the computer-readable program code executable to:

generate, by the core analytics component, a model prediction using a calibrated model of the physical system, the core analytics component including one or more computer processors;

determine, at a first sensor of a plurality of sensors connected to a routing node, an uncertainty quantification of the first sensor by estimating an uncertainty of a data point in a set of raw data collected at the first sensor by monitoring the physical system, wherein the uncertainty is estimated during a filtering process at the first sensor to reduce noise in the set of raw data, wherein the plurality of sensors and the routing node are of the sensor network component;

combine, by the core analytics component, the model prediction and the uncertainty quantification to produce a corrected model prediction representative of the state of the physical system;

adjust, at the core analytics component, a parameter of an assimilation process for raw data, based on feedback from the sensor network component; and adjust, by an edge gateway of the edge analytics component, at least one of a type and a parameter of a filtering algorithm and of the filtering process at the first sensor of the sensor network component, based on feedback from the core analytics component.

20. The computer program product of claim 19, wherein the computer-readable program code is further executable to determine the uncertainty quantification in real time using the set of raw data and the filtering process.

* * * * *